United States Patent [19]

Turner

[11] Patent Number: 5,749,304

[45] Date of Patent: May 12, 1998

[54] TELEVISION STAND

[76] Inventor: Cornelius E. Turner, 5640 Cyanamid Rd. Apt. H, Milton, Fla. 32583

[21] Appl. No.: 811,647

[22] Filed: Mar. 5, 1997

[51] Int. Cl.$^6$ ............................................. A47B 85/00
[52] U.S. Cl. ......................... 108/20; 248/522; 248/349.1
[58] Field of Search ............................. 211/1.52, 1.53; 108/20, 21, 150; 248/349.1, 186.2, 131, 522; 312/249.2, 319.7

[56] References Cited

U.S. PATENT DOCUMENTS

| | | | |
|---|---|---|---|
| 1,479,618 | 1/1924 | Mansbendel | 108/21 |
| 1,515,443 | 11/1924 | Redinger | 108/21 |
| 3,332,656 | 7/1967 | Johnson et al. | 248/349 |
| 3,486,629 | 12/1969 | Slaga | 248/349.1 |
| 3,742,870 | 7/1973 | Gusdorf et al. | 108/150 |
| 4,635,941 | 1/1987 | Sammons | 248/558 |
| 4,656,951 | 4/1987 | Kimura et al. | 108/20 |
| 4,697,778 | 10/1987 | Harashima | 248/349 |
| 5,190,261 | 3/1993 | Tetting | 248/349.1 |

*Primary Examiner*—James R. Brittain
*Assistant Examiner*—Gerald A. Anderson
*Attorney, Agent, or Firm*—Joseph N. Breaux

[57] ABSTRACT

A television stand including a base having a base bearing plate positioned on an exterior surface thereof and a motor drive compartment and a shaft passageway formed therein for receiving a motor drive assembly and a drive shaft respectively; a motor drive assembly positioned within the motor drive compartment, the motor drive assembly including a clutch coupled between a motor output shaft and a turntable drive shaft, the turntable drive shaft having a turntable drive gear attached to second end thereof, the turntable drive gear being positioned exteriorly of the base and above the base bearing plate; rotatable turntable having a turntable drive socket formed therein adjacent to an exteriorly positioned turntable bearing plate; and a turntable thrust bearing having a central bearing aperture, a section of the drive shaft being positioned through the central bearing aperture, the turntable thrust bearing being positioned between the base thrust bearing plate and the turntable thrust bearing plate. In a preferred embodiment, the television stand further includes a remote control circuit in connection with the motor drive assembly for allowing a user to remotely position the turntable.

6 Claims, 2 Drawing Sheets

TELEVISION STAND

TECHNICAL FIELD

The present invention relates to stands for televisions and the like and more particularly to a television stand having a pedestal base, a motor driven, remote control operated, rotatable turntable, and a clutch assembly coupled between a drive motor and the rotatable turntable in a manner to allow a user to position the turntable manually without damaging the drive assembly.

BACKGROUND OF THE INVENTION

Many rooms have several seating areas where it would be desirable to sit and view a television. Although the seating areas are desirable, it is often difficult or a nuisance to reposition the television each time a different seating area is selected. It would be a benefit, therefore, to have a television stand that included a motor driven turntable upon which a television could be position that could be operated to position the screen of the television in the desired viewing direction. It would be further benefit to have such a television stand that included a remote control unit that allowed a user to remotely control the direction of the television viewing screen. In addition, because small children and pets may inadvertently position themselves in the path of the moving television, it would be a further benefit to provide the motor drive assembly of the television stand with a clutch mechanism that would slip to eliminate injuries as well as to prevent damage to the drive assembly of the television stand.

SUMMARY OF THE INVENTION

It is thus an object of the invention to provide a television stand that includes a motor driven turntable.

It is a further object of the invention to provide a television stand that includes a remote control unit that allows a user to remotely control positioning of the motor driven turntable.

It is a still further object of the invention to provide a television stand that includes a pedestal base, a motor driven, remote control operated, rotatable turntable, and a clutch assembly coupled between a drive motor and the rotatable turntable in a manner to allow a user to position the turntable manually without fear of injury to small children and pets or damaging the drive assembly.

It is a still further object to provide a television stand that accomplishes some or all of the above objects in combination.

Accordingly, a television stand is provided. The television stand includes a base having a base bearing plate positioned on an exterior surface thereof and a motor drive compartment and a shaft passageway formed therein for receiving a motor drive assembly and a drive shaft respectively; a motor drive assembly positioned within the motor drive compartment, the motor drive assembly including a clutch coupled between a motor output shaft and a turntable drive shaft, the turntable drive shaft having a turntable drive gear attached to second end thereof, the turntable drive gear being positioned exteriorly of the base and above the base bearing plate; rotatable turntable having a turntable drive socket formed therein adjacent to an exteriorly positioned turntable bearing plate; and a turntable thrust bearing having a central bearing aperture, a section of the drive shaft being positioned through the central bearing aperture, the turntable thrust bearing being positioned between the base thrust

2 bearing plate and the turntable thrust bearing plate. In a preferred embodiment, the television stand further includes a remote control circuit in connection with the motor drive assembly for allowing a user to remotely position the turntable.

BRIEF DESCRIPTION OF DRAWINGS

For a further understanding of the nature and objects of the present invention, reference should be made to the following detailed description, taken in conjunction with the accompanying drawings, in which like elements are given the same or analogous reference numbers and wherein.

DESCRIPTION OF THE EXEMPLARY EMBODIMENT

Figure 1:
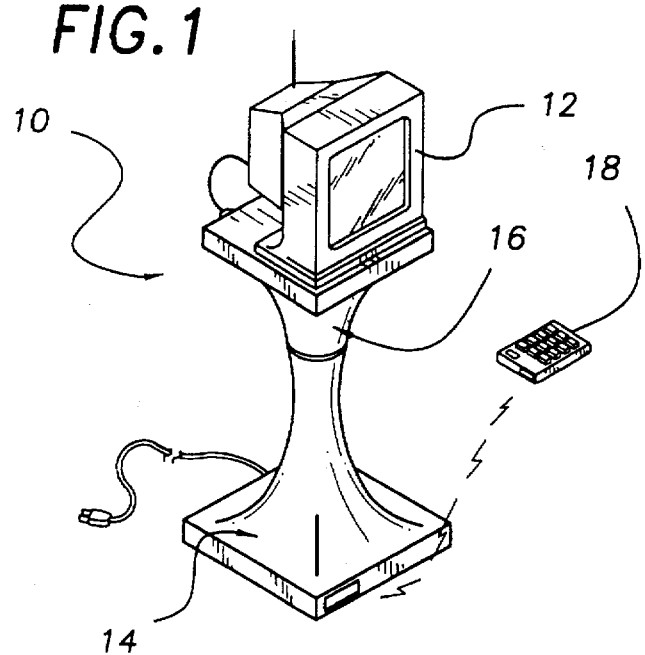
FIG. 1 is a perspective view of the television stand of the present invention in use with a representative television set showing the pedestal base, the rotatable turntable and the remote control transmitter unit.

FIG. 1 shows an exemplary embodiment of the television stand of the present invention, generally designated by the numeral 10, in use with a representative television set 12. Television stand 10 includes a pedestal base, generally designated by the numeral 14; a rotatable turntable, generally designated by the numeral 16; and a remote control transmitter unit 18.

Figure 2:
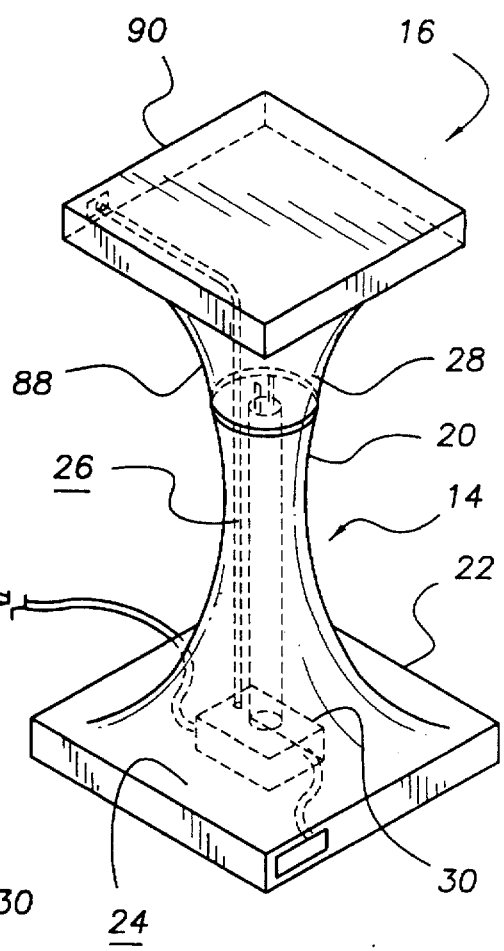
FIG. 2 is a perspective view of the television stand of FIG. 1 showing the pedestal base, the remote control receiving circuit, the motor drive assembly, the drive shaft, and the turntable thrust bearing assembly.

Referring now to FIG. 2, pedestal base 14 is molded from ABS plastic and has a tapered cylindrical top section 20 that expanding outwardly toward a square shaped bottom section 22. A motor drive compartment 24 is formed within bottom section 22 and a shaft passageway 26 is formed through top section 20. Motor drive compartment 24 and shaft passageway 26 are connected. A pedestal bearing plate 28 is formed at the top end of top section 20. Shaft passageway 26 has an opening formed through the center of bearing plate 28.

Figure 3:
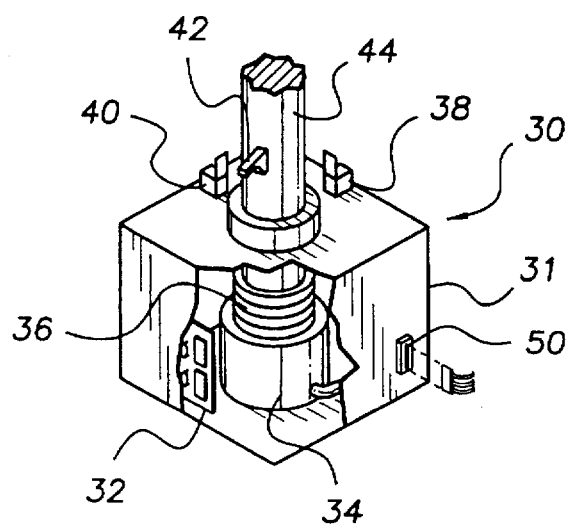
FIG. 3 is a detail, partial cut-away perspective view of the motor drive assembly showing the circuit board containing the control circuitry, the reduction gear motor, the clutch assembly, the first and second limit switches and the limit switch actuator.

A motor drive assembly, generally designated 30, is positioned within motor drive compartment 24. Referring now to FIG. 3, motor drive assembly 30 includes a drive assembly housing 31, a motor drive control circuit board 32, a reduction gear motor 34, a clutch assembly 36, a first limit switch 38, a second limit switch 40, and a limit switch actuator 42. In this embodiment limit switch actuator 42 is an L-shaped metal member secured to a lower portion of a turntable drive shaft 44. First and second limit switches 38,40 are conventional limit switches that are secured to the exterior of drive assembly housing 31 at a desired location to limit the rotation of turntable drive shaft 44. In this embodiment turntable drive shaft 44 is limited to two-hundred degrees of rotation.

Drive assembly housing 31 is constructed of metal, is substantially box shaped and is provided with a shaft aperture 48 (shown in FIG. 4) and a remote control sensing cable input 50. Reduction gear motor 34 is a conventional, low speed, high torque, D.C. powered reduction gear motor having a rotating output shaft 52 (shown in FIG. 4) coupled to turntable drive shaft 44 through clutch assembly 36.

Figure 4:
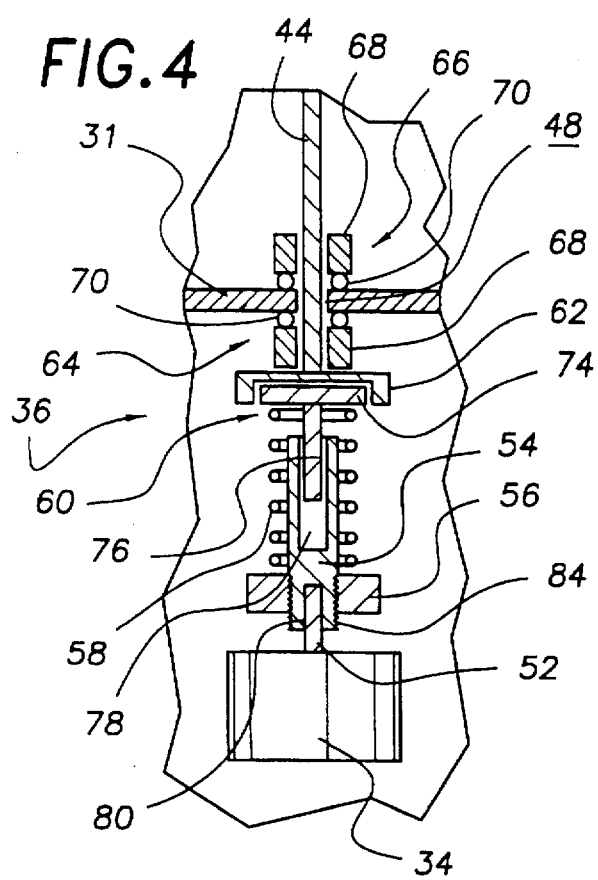
FIG. 4 is a cross-sectional view of the clutch assembly showing the motor drive shaft, the clutch drive shaft coupling, the clutch tension adjustment nut, the clutch tensioning spring, the first compression plate assembly, the second compression plate, the drive shaft, the lower drive shaft thrust bearing assembly and the upper drive shaft thrust bearing assembly.

Referring now to FIG. 4, clutch assembly 36 includes a clutch drive shaft coupling 54; a clutch tension adjustment nut 56; a clutch tensioning spring 58; a first compression plate assembly generally designated 60; a second compression plate 62; a lower drive shaft thrust bearing assembly, generally designated 64; and an upper drive shaft thrust bearing assembly, generally designated 66. Lower drive shaft thrust bearing assembly 64 and upper drive shaft thrust bearing assembly 66 each include a collar 68 and a thrust bearing mechanism 70. Collars 68 are positioned over and secured to turntable drive shaft 44 and maintain turntable drive shaft 44 rotatably affixed within shaft aperture 48 of drive assembly housing 31.

Turntable drive shaft 44 has a lower end rigidly affixed to the center of dish shaped second compression plate 62. Second compression plate 62 is constructed of brass. First compression plate assembly 60 includes a disk shaped contact plate 74 faced with a plastic facing material on the compression plate contacting side and a square profile traveler shaft 76 extending from the center of the other side thereof. Traveler shaft 76 is slidably installed within a square profile traveler pathway 78 formed within a first end of clutch drive shaft coupling 54. Traveler shaft 76 is free to slide within traveler pathway 78 but is prevented from rotating therein.

A motor shaft fitting 80 is formed info a second end of clutch drive shaft coupling 56 into which motor shaft 52 is press fit during assembly. The second end of clutch drive shaft coupling 54 has threads 84 formed thereon for threadably receiving the internally threaded clutch tension adjustment nut 56. Clutch tensioning spring 58 is a conventional spring steel compression spring positioned over clutch drive shaft coupling and compressed between clutch tension adjustment nut 56 and contact plate 74. In operation, clutch tensioning spring 58 forces contact plate 74 of first compression assembly 60 against second compression plate 62 allowing rotational force to be transmitted between motor shaft 52 and turntable drive shaft 44. By adjusting clutch tension adjustment nut 56, more or less clutch slippage can be obtained. For instance, if very small dogs or children are living in the home, the tension can be reduced to a provide a safe degree of clutch slippage.

Figure 5:
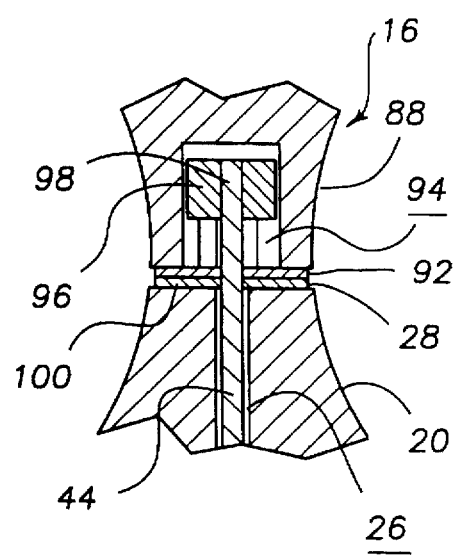
FIG. 5 is a cross-sectional view of the turntable thrust bearing assembly showing the turntable thrust bearings, the pedestal bearing plate, the turntable bearing plate, the drive gear of the drive shaft, and the turntable drive socket.

Referring back to FIG. 2, rotatable turntable 16 is molded from ABS plastic and has a tapered bottom section 88 that expands outwardly and upwardly toward a square shaped television support plate 90. With reference now to FIG. 5, turntable bottom section 88 terminates in a turntable bearing plate 92 and has a turntable drive socket 94 formed therein for receiving therein a drive gear 96 press fit onto a far end 98 of turntable drive shaft 44. Drive gear 96 is slidable into and out of turntable drive socket 94 but is not rotatable therein. Drive gear 96 transmits the rotational force for rotating turntable 16. A set of turntable thrust bearings 100 are positioned between pedestal bearing plate 28 and turntable bearing plate 92.

Figure 6:
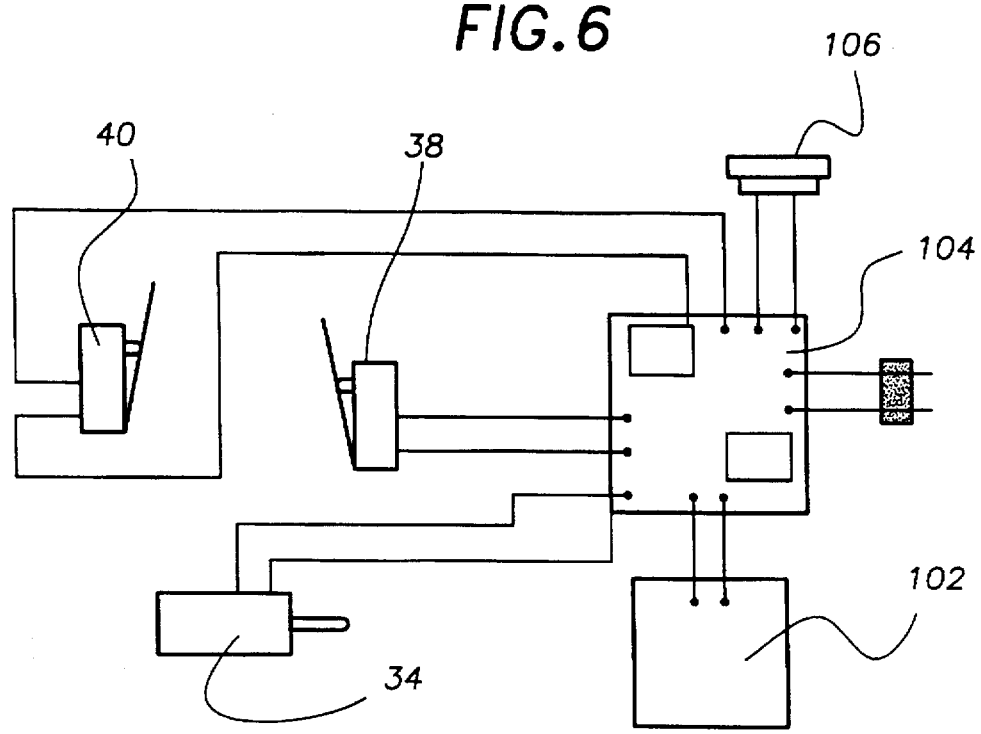
FIG. 6 is a schematic diagram of the electrical control circuit showing the remote receiving circuit, the relay control board, the A.C. outlet, the right travel limit switch and the left travel limit switch.

Referring to FIG. 6, drive motor 34 is controlled by an electrical control circuit including a remote receiving circuit 102, a relay control board 104, an A.C. outlet 106, and first and second travel limit switch 38,40. In use, remote control transmitter unit 18 (FIG. 1) is used to transmit a "turn left" or "turn right" signal to remote receiving circuit 102 which in-turn controls relays on relay control board 104 causing drive motor 34 to rotate clockwise or counter clockwise. Drive motor 34 will continue to rotate in the directed direction until no signal is received from remote control transmitter unit 18 or one of the limit switches 38,40 are actuated. Upon actuation of a limit switch 38,40 drive motor 34 can only operate in the direction away from the actuated limit switch 38,40. In this embodiment, remote receiving circuit receives signals from the auxiliary channel of a standard remote control, and remote transmitter 18 is a standard remote control having an auxiliary channel.

It can be seen From the preceding description that a television stand has been provided that includes a motor driven turntable; that includes a remote control unit that allows a user to remotely control positioning of the motor driven turntable; and that includes a pedestal base, a motor driven, remote control operated, rotatable turntable, and a clutch assembly coupled between a drive motor and the rotatable turntable in a manner to allow a user to position the turntable manually without fear of injury to small children and pets or damaging the drive assembly.

It is noted that the embodiment of the television stand described herein in detail for exemplary purposes is of course subject to many different variations in structure, design, application and methodology. Because many varying and different embodiments may be made within the scope of the inventive concept(s) herein taught, and because many modifications may be made in the embodiment herein detailed In accordance with the descriptive requirements of the law, it is to be understood that the details herein are to be interpreted as illustrative and not in a limiting sense.

What is claimed is:

1. A television stand comprising:
   a base having a base bearing plate positioned on an exterior surface thereof and a motor drive compartment and a shaft passageway formed in said base for receiving a motor drive assembly and a drive shaft respectively; and
   a rotatable turntable having a turntable drive socket formed therein adjacent to an exteriorly positioned turntable bearing plate; and
   a motor drive assembly positioned within said motor drive compartment, said motor drive assembly including a motor a clutch coupled between a motor output shaft and a first end of a turntable drive shaft, said turntable drive shaft having a turntable drive gear attached to second end thereof, said turntable drive gear being positioned exteriorly of said base and over said base bearing plate;
   a turntable thrust bearing having a central bearing aperture and a plurality of rotatably entrapped bearings, a section of said drive shaft being positioned through said central bearing aperture, to engage said drive socket said turntable thrust bearing being positioned between said base thrust bearing plate and said turntable thrust bearing plate.

2. The television stand of claim 1, further including:

a remote transmitter unit; and a remote control circuit in controlling connection with said motor drive assembly and responsive to signals transmitted from said remote transmitter unit.

3. The television stand of claim 1, wherein:

said clutch assembly includes a clutch drive shaft coupling;

a clutch tension adjustment nut;

a clutch tensioning spring;

a first compression plate assembly; and a second compression plate;

said turntable drive shaft having a lower end rigidly affixed to a center of said second compression plate;

said first compression plate assembly including a disk shaped contact plate and a traveler shaft rigidly coupled to said contact plate said traveler shaft being slidably installed within a traveler pathway formed within a first end of said clutch drive shaft coupling;

said clutch drive shaft coupling being coupled to said motor shaft and having threads formed thereon for threadably receiving an internal threading of said clutch tension adjustment nut;

said clutch tensioning spring being positioned over said clutch drive shaft coupling and compressed between said clutch tension adjustment nut and said contact plate.

4. The television stand of claim 2, wherein:

said clutch assembly includes a clutch drive shaft coupling;

a clutch tension adjustment nut;

a clutch tensioning spring;

a first compression plate assembly; and a second compression plate;

said turntable drive shaft having a lower end rigidly affixed to center of said second compression plate;

said first compression plate assembly including a disk shaped contact plate and a traveler shaft rigidly coupled to said contact plate, said traveler shaft being slidably installed within a traveler pathway formed within a first end of said clutch drive shaft coupling;

said clutch drive shaft coupling being coupled to said motor shaft and having threads formed thereon for threadably receiving an internal threading of said clutch tension adjustment nut;

said clutch tensioning spring being positioned over said clutch drive shaft coupling and compressed between said clutch tension adjustment nut and said contact plate.

5. The television stand of claim 3 wherein:

said traveler shaft has a square profile; and said traveler pathway has a square profile.

6. The television stand of claim 4 wherein:

said traveler shaft has a square profile; and said traveler pathway has a square profile.

* * * * *